United States Patent
Sarin et al.

(10) Patent No.: US 10,877,632 B2
(45) Date of Patent: Dec. 29, 2020

(54) PERFORMING AN ACTION BASED ON USER INTERACTION DATA

(71) Applicant: Capital One Services, LLC, McLean, VA (US)

(72) Inventors: Rohit Sarin, McLean, VA (US); Ryan Tomlinson, McLean, VA (US); Elizabeth Maue, McLean, VA (US); Alex Baird, McLean, VA (US); Jose Martinez, McLean, VA (US); Chengjun Zhu, McLean, VA (US); Weiyan Sun, McLean, VA (US); Robert Cezeaux, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 65 days.

(21) Appl. No.: 16/284,616

(22) Filed: Feb. 25, 2019

(65) Prior Publication Data
US 2020/0272283 A1    Aug. 27, 2020

(51) Int. Cl.
*G06F 3/0482*     (2013.01)
*G06F 3/0488*     (2013.01)
(Continued)

(52) U.S. Cl.
CPC ........ *G06F 3/0482* (2013.01); *G06F 3/04883* (2013.01); *G06F 3/167* (2013.01); *G06N 3/08* (2013.01); *G06N 20/00* (2019.01)

(58) Field of Classification Search
CPC .......... G06N 20/00; G06N 3/08; G06Q 30/02; G06Q 30/0204; G06Q 30/016;
(Continued)

(56) References Cited

U.S. PATENT DOCUMENTS

| 7,120,606 B1 * | 10/2006 | Ranzini | G06Q 20/02 705/64 |
| 7,263,506 B2 * | 8/2007 | Lee | G06Q 20/04 705/318 |

(Continued)

OTHER PUBLICATIONS

J. Brownlee, Supervised and Unsupervised Machine Learning Algorithms, published Mar. 16, 2016, https://machinelearningmastery.com/supervised-and-unsupervised-machine-learning-algorithms/ (Year: 2016).*

*Primary Examiner* — Eric J Yoon
(74) *Attorney, Agent, or Firm* — Harrity & Harrity, LLP

(57) ABSTRACT

A device obtains historical interaction data concerning a plurality of user interactions, where a user interaction of the plurality of user interactions includes one or more touchpoint sets, obtains historical response data concerning a plurality of user responses, where a user response of the plurality of user responses corresponds to a user interaction, and processes the historical interaction data and the historical response data using a modelling pipeline to determine an association between user interaction score and a touchpoint set. The device determines information concerning a current user interaction, processes the information concerning the current user interaction using the modelling pipeline to determine a current user interaction score and ranking of one or more touchpoint sets of the current user interaction, and causes, based on the current user interaction score and the ranking of the one or more touchpoint sets, at least one action to be performed.

20 Claims, 9 Drawing Sheets

(51) Int. Cl.
*G06N 3/08* (2006.01)
*G06N 20/00* (2019.01)
*G06F 3/16* (2006.01)

(58) Field of Classification Search
CPC ............. G06Q 30/0201; G06F 11/3476; G06F 11/3452; G06F 2201/86; G06F 2201/875; G04F 11/3438; H04M 2203/401
See application file for complete search history.

(56) References Cited

U.S. PATENT DOCUMENTS

| | | | | |
|---|---|---|---|---|
| 8,464,939 | B1* | 6/2013 | Taylor | G06Q 20/4016 |
| | | | | 235/380 |
| 8,606,714 | B1* | 12/2013 | Cameo | G06Q 20/10 |
| | | | | 705/35 |
| 9,386,152 | B2* | 7/2016 | Riahi | H04M 3/4936 |
| 9,723,145 | B2* | 8/2017 | Bell | H04M 3/5175 |
| 9,922,649 | B1* | 3/2018 | LoRe | G06Q 30/016 |
| 2010/0138282 | A1* | 6/2010 | Kannan | G06Q 10/06398 |
| | | | | 705/7.42 |
| 2013/0060587 | A1* | 3/2013 | Bayrak | G06Q 10/10 |
| | | | | 705/7.11 |
| 2015/0288818 | A1* | 10/2015 | Srivastava | G06F 17/21 |
| | | | | 379/88.01 |
| 2017/0316438 | A1* | 11/2017 | Konig | G06Q 30/0204 |
| 2018/0047047 | A1* | 2/2018 | Joyson | G06Q 30/0234 |
| 2018/0181704 | A1* | 6/2018 | Stupp | G16B 40/00 |
| 2019/0087745 | A1* | 3/2019 | Kurian | G06F 9/50 |
| 2019/0164170 | A1* | 5/2019 | Kataria | G06Q 10/105 |

* cited by examiner

PERFORMING AN ACTION BASED ON USER INTERACTION DATA

BACKGROUND

A response monitoring device can track responses concerning user interactions, such as website interactions, mobile application interactions, customer service interactions, and/or the like. A response may include a user survey response, a user complaint, a user rating, a user comment, and/or the like.

SUMMARY

According to some implementations, a device may include one or more memories, and one or more processors, communicatively coupled to the one or more memories, configured to obtain historical interaction data concerning a plurality of user interactions, wherein a user interaction of the plurality of user interactions includes one or more touchpoint sets, to obtain historical response data concerning a plurality of user responses, wherein a user response of the plurality of user responses corresponds to a user interaction, and to process the historical interaction data and the historical response data using a modelling pipeline to determine an association between a user interaction score and a touchpoint set, The one or more processors may determine information concerning a current user interaction of a user, process the information concerning the current user interaction using the modelling pipeline to determine a current user interaction score and a ranking of one or more touchpoint sets of the current user interaction, and cause, based on the current user interaction score and the ranking of the one or more touchpoint sets of the current user interaction, at least one action to be performed.

According to some implementations, a non-transitory computer-readable medium may store instructions that include one or more instructions that, when executed by one or more processors of a device, cause the one or more processors to obtain historical interaction data concerning a plurality of user interactions, to obtain historical response data concerning a plurality of user responses associated with the plurality of user interactions, and to process the historical interaction data and the historical response data using a modelling pipeline to determine, for a user interaction of the plurality of user interactions: a user interaction score, at least one touchpoint set, and an association between the user interaction score and the at least one touchpoint set. The one or more instructions may cause the one or more processors to obtain information concerning a current user interaction of a user, and to process the information concerning the current user interaction using the modelling pipeline to determine a current user interaction score and a ranking of one or more touchpoint sets of the current user interaction. The one or more instructions may cause the one or more processors to determine that the current user interaction score satisfies a threshold, and to cause, after determining that the current user interaction score satisfies the threshold and based on the ranking of the one or more touchpoint sets of the current user interaction, at least one action to be performed.

According to some implementations, a method may include obtaining, by a device, historical interaction data concerning a plurality of user interactions, obtaining, by the device, historical response data concerning a plurality of user responses associated with the plurality of user interactions, and processing, by the device, the historical interaction data and the historical response data to train a model to identify a correspondence between a user interaction score and a touchpoint set. The method may include obtaining, by the device, information concerning a plurality of current user interactions, processing, by the device, the information concerning the plurality of current user interactions to determine information concerning a current user interaction of the plurality of current user interactions, and processing, by the device, the information concerning the current user interaction to determine a current user interaction score using the model. The method may include generating, by the device and based on the information concerning the current user interaction, a ranking of one or more touchpoint sets of the current user interaction using the model, and performing, by the device and based on the current user interaction score and the ranking of the one or more touchpoint sets of the current user interaction, at least one action.

DETAILED DESCRIPTION

Figure 1A:
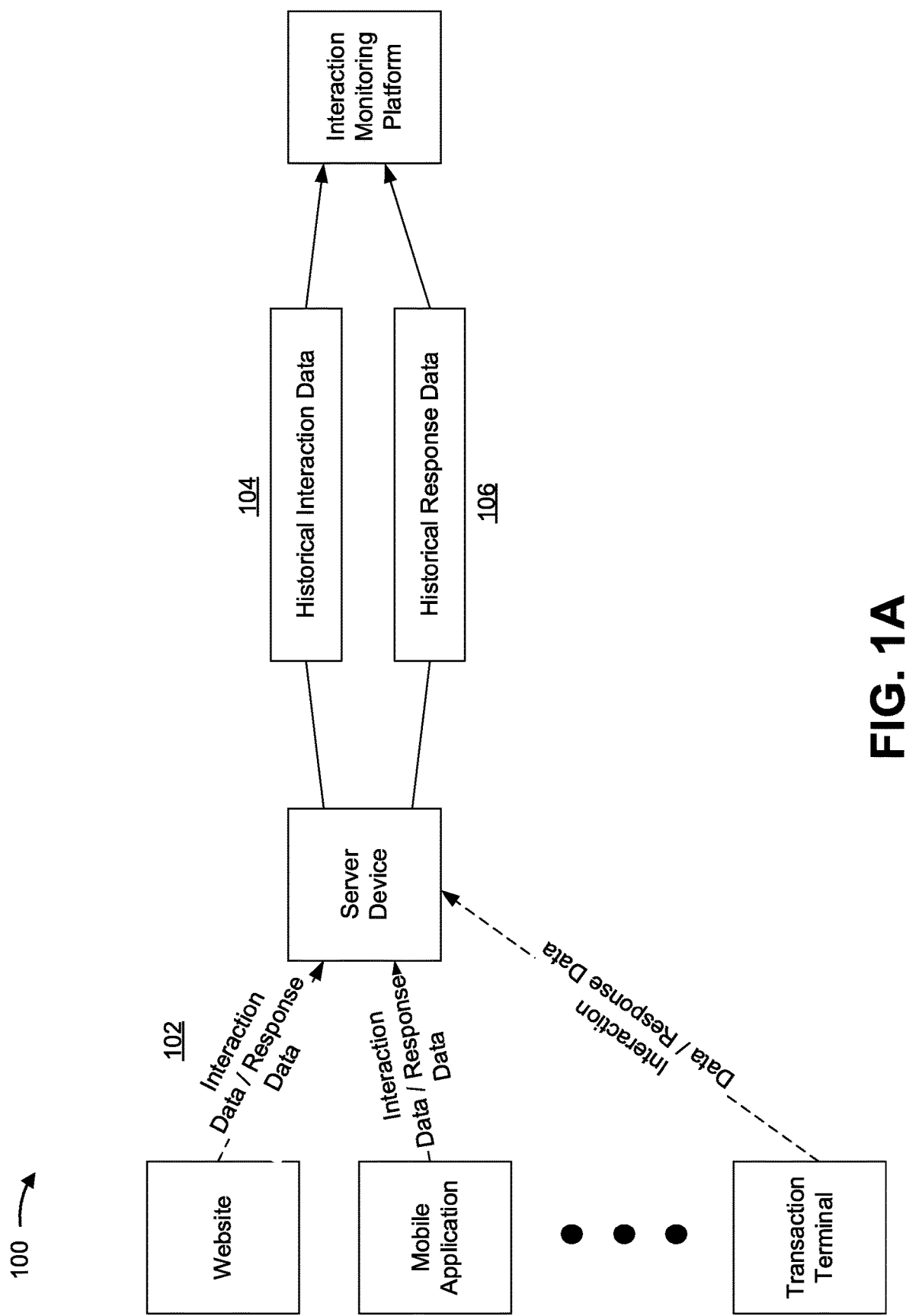
FIGS. 1A-1D are diagrams of example implementations described herein.

The following detailed description of example implementations refers to the accompanying drawings. The same reference numbers in different drawings may identify the same or similar elements.

A response monitoring device can track responses concerning user interactions, such as website interactions, mobile application interactions, customer service interactions, and/or the like. The response monitoring device can obtain information concerning a survey response (e.g., the response monitoring device can send a survey to a user at the completion of a user interaction to encourage the user to provide the survey response), information concerning a user complaint (e.g., information from a user's e-mail, a website form submission, a customer service call, and/or the like), information concerning a user rating and/or comment, and/or the like. However, the response monitoring device can only obtain information about a user interaction if the user chooses to provide a response. Further, the response monitoring device cannot determine how a user is experiencing a real-time user interaction and thus cannot perform any action to modify the real-time user interaction to improve the customer's experience concerning the real-time user interaction. This can lead to a backend device using resources (e.g., processing resources, memory resources, power resources, network resources, and/or the like) to field a user's complaint after the real-time user interaction ends that could be prevented if the user's sentiment concerning the user interaction could have been changed.

Some implementations described herein provide an interaction monitoring platform that monitors a current user interaction and performs at least one action to attempt to modify a user's current sentiment concerning the user interaction. In some implementations, the interaction monitoring platform obtains historical interaction data concerning a plurality of user interactions, where a user interaction of the plurality of user interactions includes one or more touchpoint sets, and obtains historical response data concerning a plurality of user responses, where a user response of the plurality of user responses corresponds to a user interaction. In some implementations, the interaction monitoring platform processes the historical interaction data and the historical response data using a modelling pipeline to determine an association between a user interaction score and a touchpoint set. In some implementations, the interaction monitoring platform determines information concerning a current user interaction of a user and processes the information concerning the current user interaction using the modelling pipeline to determine a current user interaction score and a ranking of one or more touchpoint sets of the current user interaction. In some implementations, the interaction monitoring platform causes, based on the current user interaction score and the ranking of the one or more touchpoint sets of the current user interaction, at least one action to be performed.

In this way, some implementations described herein can reduce usage of the resources of the backend device by reducing a likelihood that a user will have a poor user interaction and submit a complaint that needs to be processed by the backend device. This allows the backend device to devote the resources to other tasks and/or services. This can also lead to a better user experience for the user concerning the current user interaction. Moreover, some implementations described herein can provide alerts to interaction managers (e.g., by displaying an alert on a client device) to allow the interaction managers, as well as automated systems, to modify interaction characteristics, which can prevent or reduce interaction negative experiences and/or complaints from reoccurring. This can further reduce usage of the resources of the backend device.

Furthermore, implementations described herein are automated and can capture and process numerous (e.g., hundreds, thousands, millions, billions, and/or the like) data points to determine an association between a user interaction score and/or at least one user interaction pattern of a user interaction, determine a pattern importance ranking concerning the at least one user interaction pattern, and/or the like. This can improve speed and efficiency of the process and conserve computing resources (e.g., processor resources, memory resources, power resources, and/or the like) of the interaction monitoring platform that would otherwise be used to attempt to determine user interaction issues.

FIGS. 1A-1D are diagrams of example implementations 100 described herein. As shown in FIG. 1A, example implementations 100 may include a server device (e.g., one or more devices capable of receiving, generating, storing, processing, and/or providing information associated with user interactions) and an interaction monitoring platform (e.g., a system that monitors the user interactions). Some example implementations described herein concern a single server device and/or a single interaction monitoring platform, but implementations can include a plurality of server devices and/or a plurality of interaction monitoring platforms. In some implementations, the server device and the interaction monitoring platform may be connected via a network, such as the internet, an intranet, and/or the like.

As shown by reference number 102, the server device may receive interaction data and/or response data. In some implementations, the server device may obtain (e.g., receive, collect, capture, and/or the like) the interaction data and/or response data. The interaction data may concern one or more user interactions (e.g., one or more interactions between a user and a person, a device, an interface of an application, and/or the like of an organization). A user interaction may be a website interaction, a mobile application interaction, a transaction card terminal interaction, a payment interaction, a withdrawal interaction, a deposit interaction, a returned payment interaction, a bill payment interaction, a customer service interaction, a virtual assistant interaction (e.g., via a chatbot or an interactive voice response (IVR) device), a point of sale interaction, a financial product interaction, a financial product application interaction, a financial account interaction, and/or the like. A user interaction may comprise one or more touchpoints (e.g., one or more pieces of information) concerning the user interaction. For example, a touchpoint may include information concerning who initiated the user interaction (e.g., the user, a representative of an organization, a virtual assistant, and/or the like); information concerning how the user interaction was initiated (e.g., via a website, a mobile application, a transaction card terminal, and/or the like); information concerning why the user interaction was initiated (e.g., the user wanted to pay a bill that is past due, the user wanted to transfer money between financial accounts, and/or the like); information concerning what was conveyed during the user interaction (e.g., identification information concerning the user; information concerning a user account, a financial account, a financial product, a financial product application, a bill; and/or the like); information concerning how long the user interaction lasted (e.g., an amount of time between initiation of the user interaction and termination of the user interaction); information concerning a wait time associated with the user interaction (e.g., an amount of time between initiation of the user interaction and when a representative of an organization and/or virtual assistant communicated with the user); information concerning whether the user interaction is associated with an existing user interaction issue (e.g., whether the user initiated a customer service interaction to discuss a reoccurring issue with a bill, a financial account, and/or the like); information concerning whether the user indicated dissatisfaction with the user interaction (e.g., whether the user requested to talk to a customer service representative, whether the user indicated that the user needed help during the user interaction, and/or the like); information concerning whether a corrective action was taken to address the user's dissatisfaction with the user interaction (e.g., whether a virtual assistant call was routed to a customer service representative, whether a customer service representative called the user after the user interaction, whether the user was offered a monetary credit, a discount, and/or the like); and/or the like.

The response data may concern one or more user responses concerning the one or more user interactions included in the interaction data. A response may include a user survey response, a user complaint, a user rating, a user comment, and/or the like. In some implementations, a user response, of the one or more user responses, may correspond to a user interaction of the one or more user interactions. For example, a user response may be a survey response that corresponds to a financial product application interaction (e.g., a survey response regarding a user's experience applying for a financial product). In some implementations, a response may include information that indicates a user's sentiment regarding the user interaction (e.g., whether the user was happy with the user interaction, whether the user was unhappy with the user interaction, whether the user was satisfied with the user interaction, whether the user was unsatisfied with the user interaction, and/or the like). In some implementations, the response may include information that indicates whether a corrective action changed the user's sentiment regarding the user interaction (e.g., whether routing a call from a virtual assistant to a customer service representative changed the user's opinion of the user interaction, whether an offer of a monetary credit, a discount, and/or the like, changed the user's opinion of the user interaction, and/or the like).

As shown by reference number 104, the server device may collect historical interaction data for a historical period of time (e.g., capture and store interaction data from a particular period of time in the past). In some implementations, the historical interaction data may concern a plurality of user interactions for the historical period of time. In some implementations, the historical interaction data may concern a plurality of users, where each user, of the plurality of users, is associated with a set of user interactions, of the plurality of user interactions. In some implementations, the server device may send the historical interaction data to the interaction monitoring platform (e.g., transmit the historical interaction data to the interaction monitoring platform via the network). In some implementations, the interaction monitoring platform may obtain the historical interaction data from the server device via the network.

As shown by reference number 106, the server device may collect historical response data for the historical period of time (e.g., capture and store response data from the historical period of time that corresponds with the historical interaction data). In some implementations, the historical response data may correspond to the historical interaction data (e.g., a user response, of the one or more user responses, of the historical response data corresponds to a user interaction, of the one or more user interactions, of the historical interaction data). In some implementations, the server device may send the historical response data to the interaction monitoring platform (e.g., transmit the historical response data to the interaction monitoring platform via the network). In some implementations, the interaction monitoring platform may obtain the historical response data from the server device via the network.

Figure 1B:
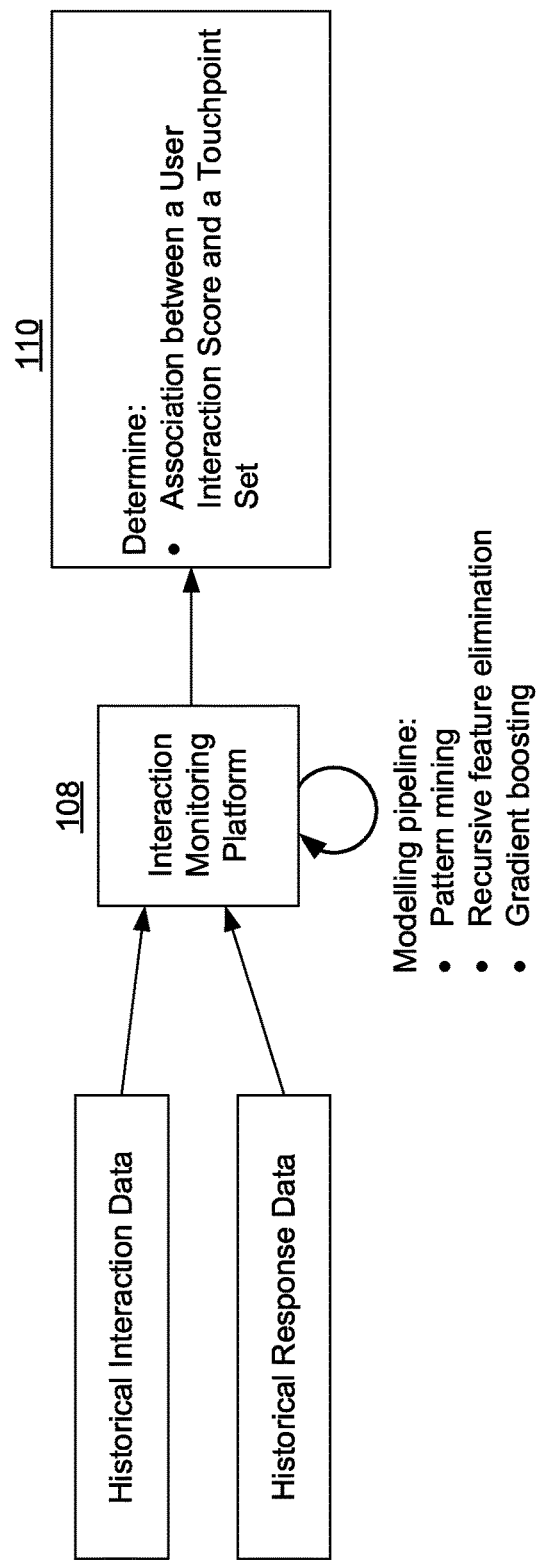

As shown in FIG. 1B, the interaction monitoring platform may process the historical interaction data and/or the historical response data. As shown by reference number 108, the interaction monitoring platform may process the historical interaction data and/or the historical response data using a modelling pipeline. In some implementations, the modelling pipeline may include performing one or more steps using one or more techniques, such as a pattern mining technique, a recursive feature elimination technique, a gradient boosting technique, and/or the like.

In some implementations and as a first step in the modelling pipeline, the interaction monitoring platform may process the historical interaction data and/or the historical response data to determine a respective user interaction score of each user interaction of the one or more user interactions of the historical interaction data. In some implementations, the interaction monitoring platform may determine which responses of the historical response data correspond to which user interactions of the historical interaction data and may determine, for a user interaction, of the one or more interactions, a user interaction score based on the response that corresponds with the user interaction. For example, the interaction monitoring platform may process the portion of the response data that indicates the user's sentiment to determine the user interaction score. The user interaction score may indicate whether the user interaction was positive and/or negative and/or to what degree the user interaction was positive and/or negative (e.g., the interaction score may rate the user interaction on a scale of one to ten, where a score of one indicates an extremely negative interaction and a score of ten indicates an extremely positive interaction).

In some implementations and as a second step in the modelling pipeline, the interaction monitoring platform may process the historical interaction data and/or the historical response data to determine a respective one or more touchpoint sets associated with each user interaction of the one or more user interactions of the historical interaction data. A touchpoint set may include particular touchpoints, of the one or more touchpoints, associated with a user interaction. For example, a touchpoint set may include the information concerning who initiated the user interaction and the information concerning what was conveyed during the user interaction. Multiple touchpoint sets may be associated with a user interaction (e.g., a first touchpoint set may include a first group of touchpoints, a second touchpoint set may include a second group of touchpoints, and/or the like). A touchpoint, of the one or more touchpoints, may be in any of the multiple touchpoint sets or none of the multiple touchpoint sets. In some implementations, the interaction monitoring platform may process the historical interaction data and/or the historical response data using a pattern mining technique, such as a sequential pattern mining technique (e.g. a sequential pattern discovery using equivalence classes (SPADE) technique, a frequent closed sequential pattern mining technique, a vertical mining of maximal sequential patterns (VMSP) technique, and/or the like) to determine the respective one or more touchpoint sets associated with each user interaction of the one or more user interactions of the historical interaction data.

In some implementations and as a third step in the modelling pipeline, the interaction monitoring platform may process the respective user interaction score and/or the respective one or more touchpoint sets of each user interaction of the one or more user interactions of the historical interaction data (hereinafter referred to as the historical user interaction score and touchpoint set data) to generate and/or train a machine learning model. As shown by reference number 110, the interaction monitoring platform may process the historical user interaction score and touchpoint set data to train the machine learning model to determine an association between a user interaction score and a touchpoint set of a user interaction. For example, the interaction monitoring platform may train the machine learning model to determine whether and to what degree a particular touchpoint set (e.g., a group of touchpoints) of a user interaction is associated with a particular user interaction score. Moreover, the interaction monitoring platform may train the machine learning model to determine whether and to what degree a particular touchpoint set affects the particular user interaction score (e.g., whether and to what degree a corrective action changed a user's sentiment regarding the particular user interaction).

In some implementations, the interaction monitoring platform may perform a set of data manipulation procedures to process the historical user interaction score and touchpoint set data to generate the machine learning model, such as a data preprocessing procedure, a model training procedure, a model verification procedure, and/or the like. For example, the interaction monitoring platform may preprocess the historical user interaction score and user interaction pattern data to remove numbers and/or letters, non-ASCII characters, other special characters, white spaces, confidential data, and/or the like. In this way, the interaction monitoring platform may organize thousands, millions, or billions of data entries for machine learning and model generation.

In some implementations, the interaction monitoring platform may perform a training operation when generating the machine learning model. For example, the interaction monitoring platform may portion the historical user interaction score and touchpoint set data into a training set, a validation set, a test set, and/or the like. In some implementations, a minimum feature set may be created from pre-processing and/or dimensionality reduction of the historical user interaction score and touchpoint set data. In some implementations, the interaction monitoring platform may train the machine learning model on this minimum feature set, thereby reducing processing to train the machine learning model, and may apply a classification technique to the minimum feature set.

In some implementations, the interaction monitoring platform may use a classification technique, such as a logistic regression classification technique, a random forest classification technique, a gradient boosting machine (GBM) classifier technique, and/or the like to determine a categorical outcome (e.g., that a particular user interaction score is associated with a particular touchpoint set). Additionally, or alternatively, the interaction monitoring platform may perform a recursive feature elimination procedure to split the data of the minimum feature set into partitions and/or branches, and use the partitions and/or branches to perform predictions (e.g., that a particular user interaction score is associated with a particular touchpoint set). Based on using the recursive feature elimination procedure, the interaction monitoring platform may reduce utilization of computing resources relative to manual, linear sorting and analysis of data points, thereby enabling use of thousands, millions, or billions of data points to train the machine learning model, which may result in a more accurate machine learning model than using fewer data points.

Additionally, or alternatively, the interaction monitoring platform may use a support vector machine (SVM) classifier technique to generate a non-linear boundary between data points in the training set. In this case, the non-linear boundary is used to classify test data (e.g., historical user interaction score and touchpoint set data) into a particular class (e.g., a class indicating that a particular user interaction score is associated with a particular touchpoint set).

Additionally, or alternatively, the interaction monitoring platform may train the machine learning model using a supervised training procedure that includes receiving input to the model from a subject matter expert, which may reduce an amount of time, an amount of processing resources, and/or the like to train the machine learning model relative to an unsupervised training procedure. In some implementations, the interaction monitoring platform may use one or more other model training techniques, such as a neural network technique, a latent semantic indexing technique, and/or the like. For example, the interaction monitoring platform may perform an artificial neural network processing technique (e.g., using a two-layer feedforward neural network architecture, a three-layer feedforward neural network architecture, and/or the like) to perform pattern recognition with regard to patterns of particular user interaction scores associated with particular touchpoint sets. In this case, using the artificial neural network processing technique may improve an accuracy of the machine learning model generated by the interaction monitoring platform by being more robust to noisy, imprecise, or incomplete data, and by enabling the interaction monitoring platform to detect patterns and/or trends undetectable to human analysts or systems using less complex techniques.

Accordingly, the interaction monitoring platform may use any number of artificial intelligence techniques, machine learning techniques, deep learning techniques, and/or the like to determine an association between a user interaction score and a touchpoint set of a user interaction.

Figure 1C:
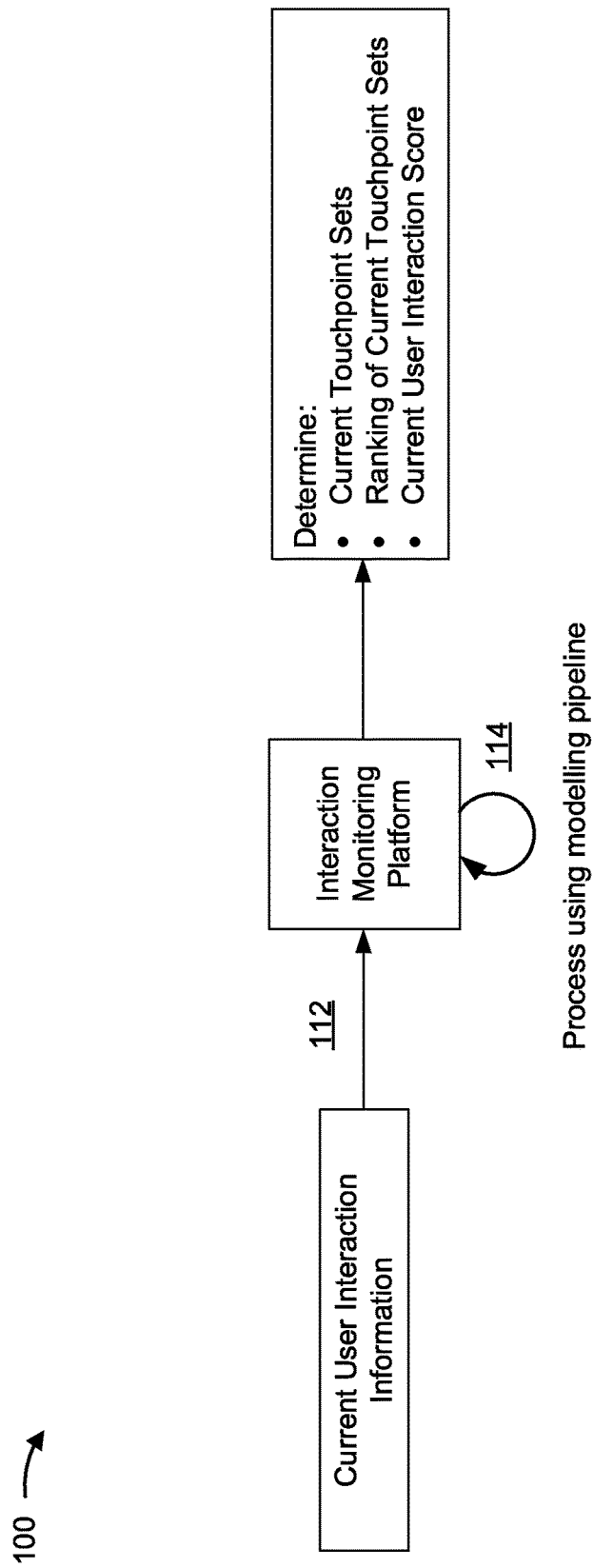

As shown in FIG. 1C and by reference number 112, the interaction monitoring platform may obtain current user interaction information. In some implementations, the current user interaction information concerns a current user interaction of a user. The interaction monitoring platform may obtain the current user interaction information in real-time (e.g., as the current user interaction takes place). For example, the server device may obtain the current user interaction information and send the current user interaction information to the interaction monitoring platform in real-time. In some implementations, the interaction monitoring platform may obtain information concerning a plurality of current user interactions (e.g., information concerning multiple current user interactions happening at the same time) from one or more server devices. The interaction monitoring platform may obtain the information concerning the plurality of current user interactions in real-time.

As shown by reference number 114, the interaction monitoring platform may process the current user interaction information using one or more steps of the modelling pipeline. For example, the interaction monitoring platform may process the current user interaction information using the pattern mining technique of the modelling pipeline to determine one or more touchpoint sets associated with the current user interaction.

In some implementations, the interaction monitoring platform may determine a ranking of the one or more touchpoint sets of the current user interaction. For example, the interaction monitoring platform may process the one or more touchpoint sets associated with the current user interaction using the machine learning model of the modelling pipeline to determine an estimated user interaction score associated with each touchpoint set, of the one or more touchpoints sets, and a degree of association between the touchpoint set and the estimated user interaction score. The interaction monitoring platform may rank the one or more touchpoint sets by the degree of association each touchpoint set has with a respective estimated user interaction score (e.g., a touchpoint set with a high degree of association with an estimated user interaction score is ranked higher than a touchpoint set with a low degree of association with an estimated user interaction score).

In some implementations, the interaction monitoring platform may determine the current user interaction score based on the one or more touchpoint sets associated with the current user interaction. For example, the interaction monitoring platform may process the one or more touchpoint sets associated with the current user interaction using an average based on the respective estimated user interaction score associated with each touchpoint set. The average may be weighted based on the degree of association associated with the respective estimated user interaction score of each touchpoint set. In some implementations, the interaction monitoring platform may determine the current user interaction score based on the ranking of the one or more touchpoint sets of the current user interaction. For example, the interaction monitoring platform may assign the current user interaction score the value of the estimated user interaction score associated with the highest ranking touchpoint set (e.g., the current user interaction score is assigned the value of the estimated user interaction score that has the highest degree of association with a touchpoint set of the one or more touchpoint sets of the current user interaction).

In some implementations, the interaction monitoring platform may determine, based on the current interaction user score, a current sentiment of the user at a current stage of the current user interaction; a current likelihood that the user will provide a response concerning the current stage of the current user interaction (e.g., a likelihood that the user will call to complain, send an email, leave a comment on a website, and/or the like), a current likelihood that the user will respond to marketing concerning the current stage of the current user interaction, and/or the like.

Figure 1D:
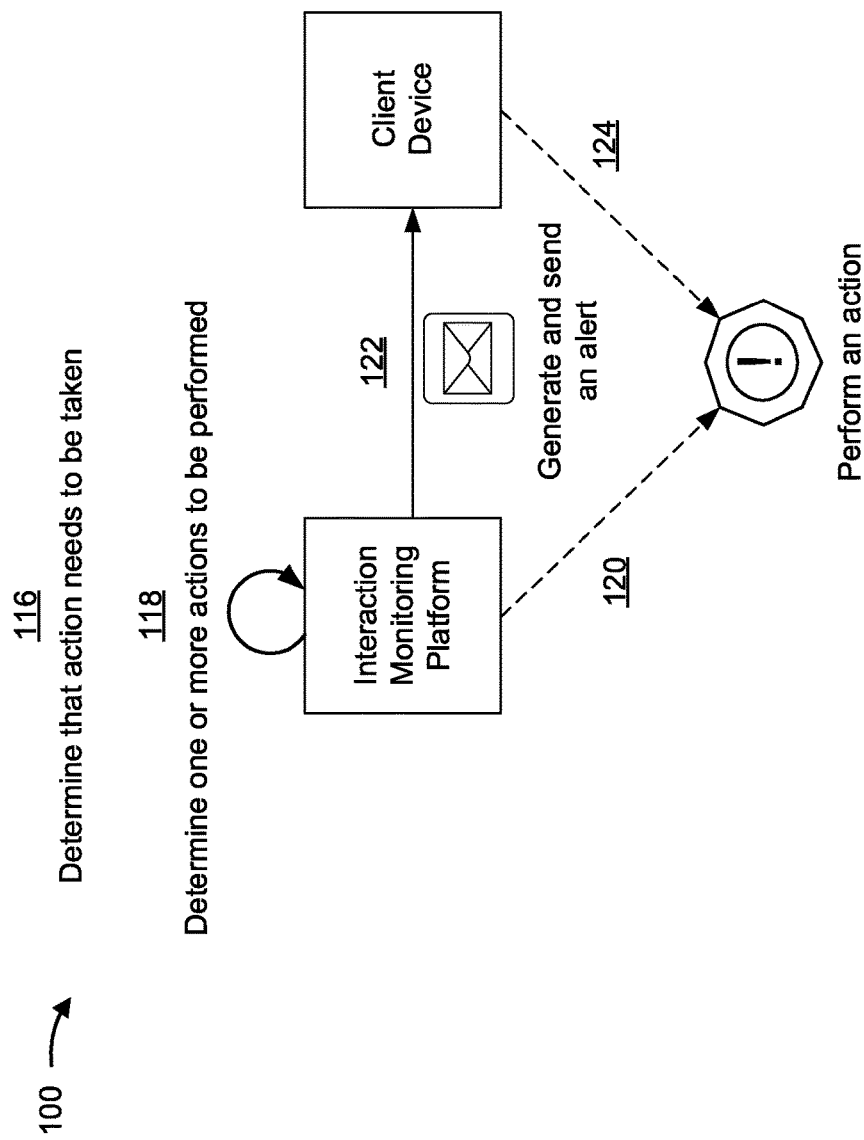

As shown in FIG. 1D and by reference number 116, the interaction monitoring platform may determine that action needs to be taken. In some implementations, the interaction monitoring platform may determine that action needs to be taken based on the current user interaction score. For example, the interaction monitoring platform may determine that the current user score satisfies a threshold (e.g., the current user score is less than the threshold, which indicates that the user is currently experiencing a negative interaction) to determine that action needs to be taken to facilitate changing the current user score.

As shown by reference number 118, the interaction monitoring platform may determine one or more actions to be performed. In some implementations, the interaction monitoring platform may determine the one or more actions to be performed based on and/or in response to determining that action needs to be taken. In some implementations, the one or more actions have a high likelihood of improving the current user interaction score (e.g., make the user experience better).

Additionally, or alternatively, the interaction monitoring platform may determine the one or more actions to be performed based on the one or more touchpoint sets of the current user interaction. For example, the interaction monitoring platform may process the one or more touchpoint sets of the current user interaction using the machine learning model of the modelling pipeline to determine the one or more actions. The machine learning model may identify one or more additional touchpoint sets that would improve the user's interaction experience (e.g., increase the current user interaction score to a level higher than the level of the current user interaction score). The interaction monitoring platform may determine the one or more actions based on the one or more additional touchpoint sets (e.g., determine which actions are associated with the one or more additional touchpoint sets).

Additionally, or alternatively, the interaction monitoring platform may determine the one or more actions to be performed based on the ranking of the one or more touchpoint sets of the current user interaction. In some implementations, the interaction monitoring platform may determine the highest ranking touchpoint set of the current user interaction (e.g., the touchpoint set with the highest degree of association with the current user interaction score) and determine, based on the highest ranking touchpoint set, the one or more actions to be performed. For example, the interaction monitoring platform may process the highest ranking touchpoint set using the machine learning model of the modelling pipeline to determine an additional touchpoint set. The additional touchpoint set may have a greater user interaction score than the current user interaction score and/or may have a greater degree of association with the greater user interaction score than the degree of association that the highest ranking touchpoint set has with the current user interaction score. The interaction monitoring platform may determine the one or more actions based on the additional touchpoint set (e.g., determine which actions are associated with the additional touchpoint set).

In some implementations, the one or more actions may be specific to a type of the current user interaction. For example, when the current user interaction concerns an interaction between the user and an organization, the one or more actions may include determining that a representative of the organization is to communicate with the user; determining a communication device of the representative and/or a communication device of the user; and/or causing the communication device of the representative to initiate a communication session with the communication device of the user (e.g., by sending a signal with an instruction to initiate the communication session to the communication device of the representative). As another example, when the current user interaction concerns an organization, the one or more actions may include determining an availability of the user and/or scheduling, based on the availability of the user, a time for the representative of the organization to call the user. In another example, one or more actions may include determining a user device associated with the current user interaction and/or initiating a communication session with the user device to enable a virtual assistant to communicate with the user of the user device. In this way, the one or more actions can facilitate a representative and/or a virtual assistant directly communicating with a user when the interaction monitoring platform determines that the user is having a poor interaction with the organization.

As another example, when the current user interaction concerns a user interacting with an interactive voice response (IVR) system via a communication session, the one or more actions may include changing a menu routing path of the IVR system (e.g., providing a menu to talk to a representative after determining that the user is frustrated with communicating with the IVR system). In another example, the one or more actions may include preventing the IVR system from communicating with the user via the communication session and/or connecting the communication session to a communication device of a representative. In this way, the one or more actions can facilitate a better IVR system interaction when the interaction monitoring platform determines that the user is having a poor IVR system interaction.

As another example, when the current user interaction concerns a financial account of the user, the one or more actions may include determining a monetary credit and/or causing the monetary credit to be added to the financial account of the user. In this way, the one or more actions can facilitate providing funds to the financial account to compensate for a poor financial account interaction.

In another example, when the current user interaction concerns a bill of the user, the one or more actions may include determining information concerning the bill; calculating, based on the information concerning the bill, a bill discount; generating a message concerning the bill discount; and/or sending the message to an electronic messaging account (e.g., an e-mail account) associated with the user. As another example, when the current user interaction concerns an account of the user and a bill, the one or more actions may include determining that the account has insufficient assets to pay the bill; causing assets of another account of the user to be transferred to the account; scheduling a date for the bill to be paid using assets of the account; and/or enrolling the account in an overdraft protection plan. In this way, the one or more actions may facilitate providing a bill discount and/or payment of a bill using a user's funds across many different accounts to compensate for a poor bill review and/or poor bill payment interaction.

As another example, when the current user interaction concerns a transaction card of the user and a transaction terminal, the one or more actions may include determining an issue concerning the transaction card; causing the transaction terminal to decline the transaction card (e.g., by sending a signal with an instruction to decline the transaction card to the transaction terminal); causing a different device to cancel the transaction card (e.g., by sending a signal with an instruction to cancel the transaction card to the different device); and/or causing the different device to issue a new transaction card to the user (e.g., by sending a signal with an instruction to issue a new transaction card to the different device). In this way, the one or more actions may facilitate automatically issuing a new transaction card to address an issue concerning a poor transaction card interaction.

In another example, the one or more actions may include generating a survey; sending the survey to a user device associated with the user; receiving, based on sending the survey, a survey response; and retraining the machine learning model of the modelling pipeline based on the survey and the survey response. In this way, the one or more actions may include facilitate automatically updating the machine learning model when the interaction monitoring platform determines that the user is having a poor interaction, which can prevent poor interactions from reoccurring in the future.

As shown by reference number 120, the interaction monitoring platform may perform the one or more actions. Additionally, or alternatively, the interaction monitoring platform may cause the one or more actions to be performed by a different device, such as the server device, a client device and/or the like. As shown by reference number 122, the interaction monitoring platform may generate and send an alert to the different device (shown in FIG. 1D as the client device). The alert may include one or more instructions for the different device to perform the one or more actions. As shown by reference number 124, the different device may receive the alert and, based on the alert, perform the one or more actions. For example, the different device may execute the one or more instructions included in the alert to cause the different device to perform the one or more actions.

In some implementations, the alert includes display information. The display information may include information that indicates the current user interaction score, information that indicates that action needs to be taken, information that indicates the one or more actions, and/or the like. In some implementations, the different device may receive the alert and cause display, based on the alert, of the display information on a display of the different device. For example, the different device may cause display of an indicator that indicates that action needs to be taken. As another example, the different device may cause display of the information that indicates the current user interaction score and/or the information that indicates the one or more actions on the display of the different device. In some implementations, a user of the different device may see the display of the display information on the different device, and may enter input into the different device, via an input interface of the different device, to cause the different device to perform the one or more actions. For example, the user may enter input that causes the different device to execute the one or more instructions included in the alert to cause the different device to perform the one or more actions.

As indicated above, FIGS. 1A-1D are provided merely as an example. Other examples may differ from what was described with regard to FIGS. 1A-1D.

Figure 2:
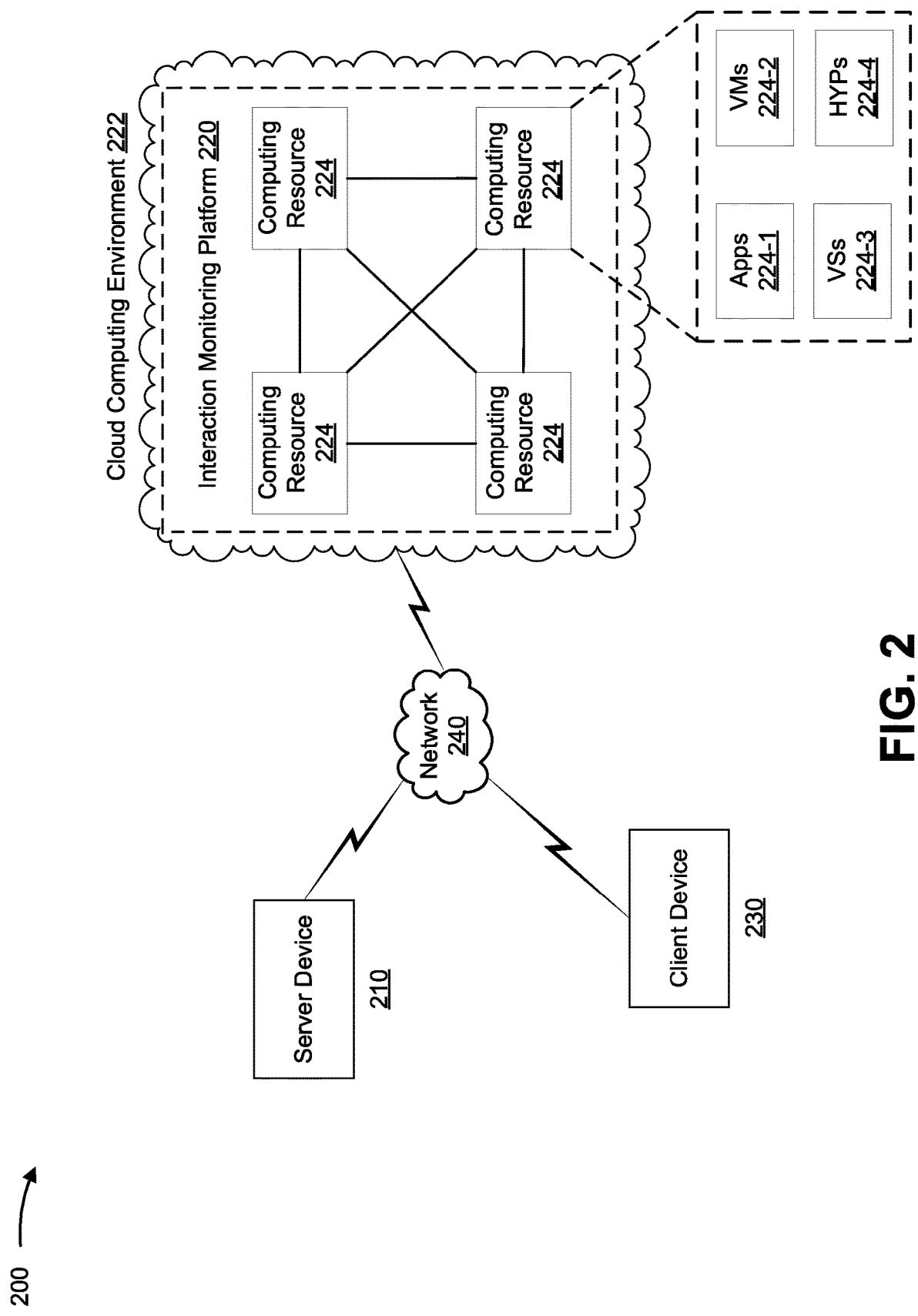
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a server device 210, an interaction monitoring platform 220, a client device 230, and/or the like. Devices of environment 200 may interconnect via wired connections, wireless connections, or a combination of wired and wireless connections.

Server device 210 includes one or more devices capable of receiving, generating, storing, processing, and/or providing information associated with user interactions. For example, server device 210 may include a server device (e.g., a host server, a web server, an application server, etc.), a data center device, or a similar device. In some implementations, server device 210 may be capable of communicating with client device 230 and/or interaction monitoring platform 220, in a manner designed to facilitate collection of interaction data and/or response data. For example, server device 210 may receive, obtain and/or capture interaction data and/or response data, may collect historical interaction data and/or historical response data for a historical period of time, and/or may send the historical interaction data and/or historical response data to interaction monitoring platform 220. Server device 210 may obtain current user interaction information in real-time and/or send the current user interaction information to interaction monitoring platform 220 in real-time.

Interaction monitoring platform 220 includes one or more devices that receive and/or process information (e.g., historical interaction data and/or historical response data, current user interaction information, one or more touchpoints, and/or the like), generate information (e.g., a user interaction score of a user interaction, an association between the user interaction score and a touchpoint set, a ranking of one or more touchpoint sets of the user interaction, and/or the like), determine information (e.g a user interaction score of a user interaction, an association between the user interaction score and a touchpoint set, a ranking of one or more touchpoint sets of the user interaction, and/or the like) and/or generate an alert indicating that action needs to be taken. Interaction monitoring platform 220 may perform, or cause to be performed, at least one action.

In some implementations, interaction monitoring platform 220 can be designed to be modular such that certain software components can be swapped in or out depending on a particular need. As such, interaction monitoring platform 220 can be easily and/or quickly reconfigured for different uses. In some implementations, interaction monitoring platform 220 can receive information from and/or transmit information to server device 210, client device 230, and/or the like.

In some implementations, as shown, interaction monitoring platform 220 can be hosted in a cloud computing environment 222. Notably, while implementations described herein describe interaction monitoring platform 220 as being hosted in cloud computing environment 222, in some implementations, interaction monitoring platform 220 cannot be cloud-based (i.e., can be implemented outside of a cloud computing environment) or can be partially cloud-based.

Cloud computing environment 222 includes an environment that hosts interaction monitoring platform 220. Cloud computing environment 222 can provide computation, software, data access, storage, etc. services that do not require end-user knowledge of a physical location and configuration of system(s) and/or device(s) that hosts interaction monitoring platform 220. As shown, cloud computing environment 222 can include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 can host interaction monitoring platform 220. The cloud resources can include compute instances executing in computing resource 224, storage devices provided in computing resource 224, data transfer devices provided by computing resource 224, etc. In some implementations, computing resource 224 can communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that can be provided to or accessed by client device 230. Application 224-1 can eliminate a need to install and execute the software applications on client device 230. For example, application 224-1 can include software associated with interaction monitoring platform 220 and/or any other software capable of being provided via cloud computing environment 222. In some implementations, one application 224-1 can send/receive information to/from one or more other applications 224-1, via virtual machine 224-2.

Virtual machine 224-2 includes a software implementation of a machine (e.g., a computer) that executes programs like a physical machine. Virtual machine 224-2 can be either a system virtual machine or a process virtual machine, depending upon use and degree of correspondence to any real machine by virtual machine 224-2. A system virtual machine can provide a complete system platform that supports execution of a complete operating system ("OS"). A process virtual machine can execute a single program, and can support a single process. In some implementations, virtual machine 224-2 can execute on behalf of a user (e.g., client device 230 or an operator of interaction monitoring platform 220), and can manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 224-4 can provide hardware virtualization techniques that allow multiple operating systems (e.g., "guest operating systems") to execute concurrently on a host computer, such as computing resource 224. Hypervisor 224-4 can present a virtual operating platform to the guest operating systems, and can manage the execution of the guest operating systems. Multiple instances of a variety of operating systems can share virtualized hardware resources.

Client device 230 includes one or more devices capable of receiving, generating, storing, processing, and/or providing information associated with user interaction. For example, client device 230 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Client device 230 may receive and/or obtain an alert from interaction monitoring platform 220. Client device may display the alert and/or perform, or cause to be performed, at least one action based on the alert.

Network 240 includes one or more wired and/or wireless networks. For example, network 240 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
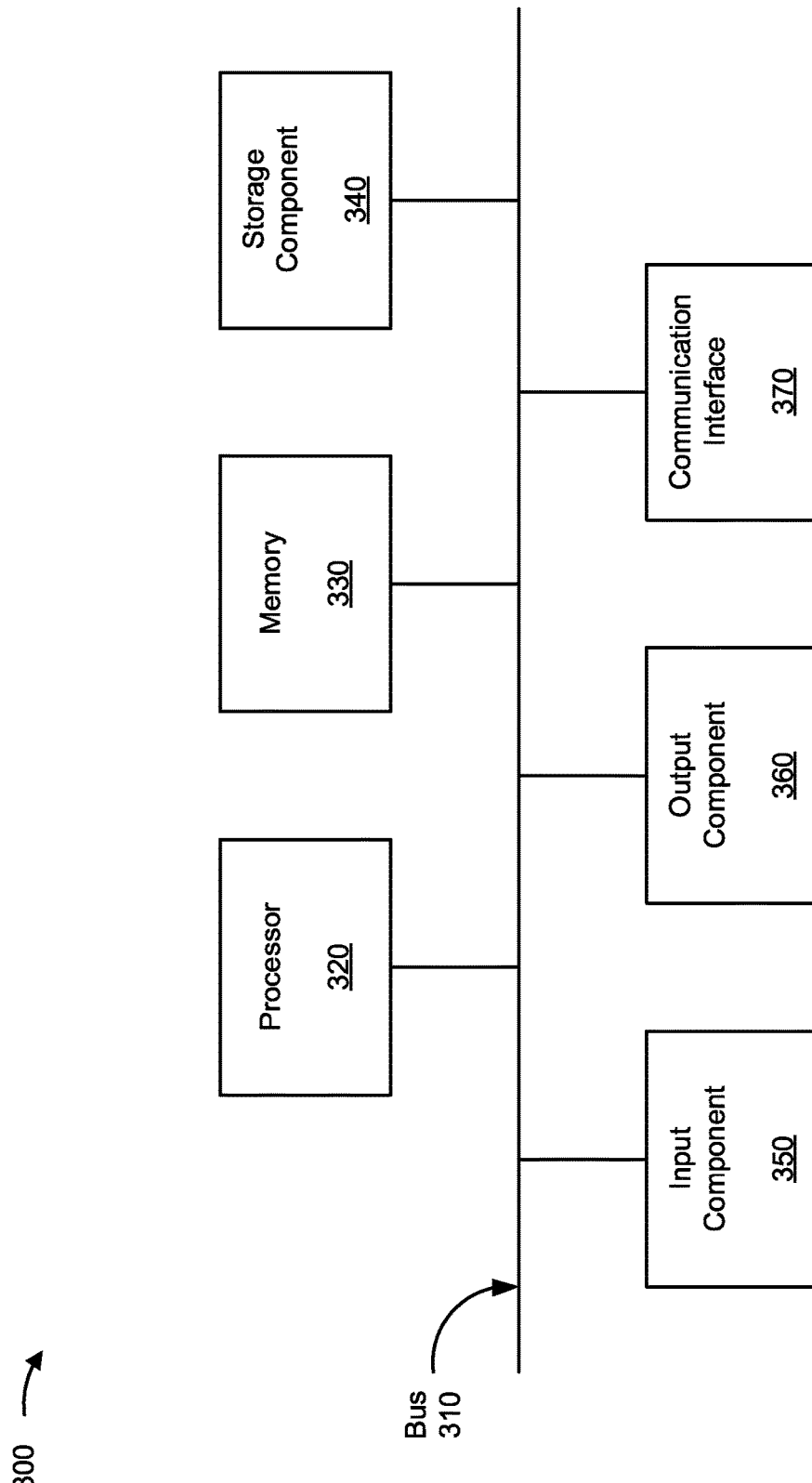
FIG. 3 is a diagram of example components of one or more devices of FIG. 2.

FIG. 3 is a diagram of example components of a device 300. Device 300 may correspond to server device 210, interaction monitoring platform 220, computing resource 224, and/or client device 230. In some implementations, server device 210, interaction monitoring platform 220, computing resource 224, and/or client device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
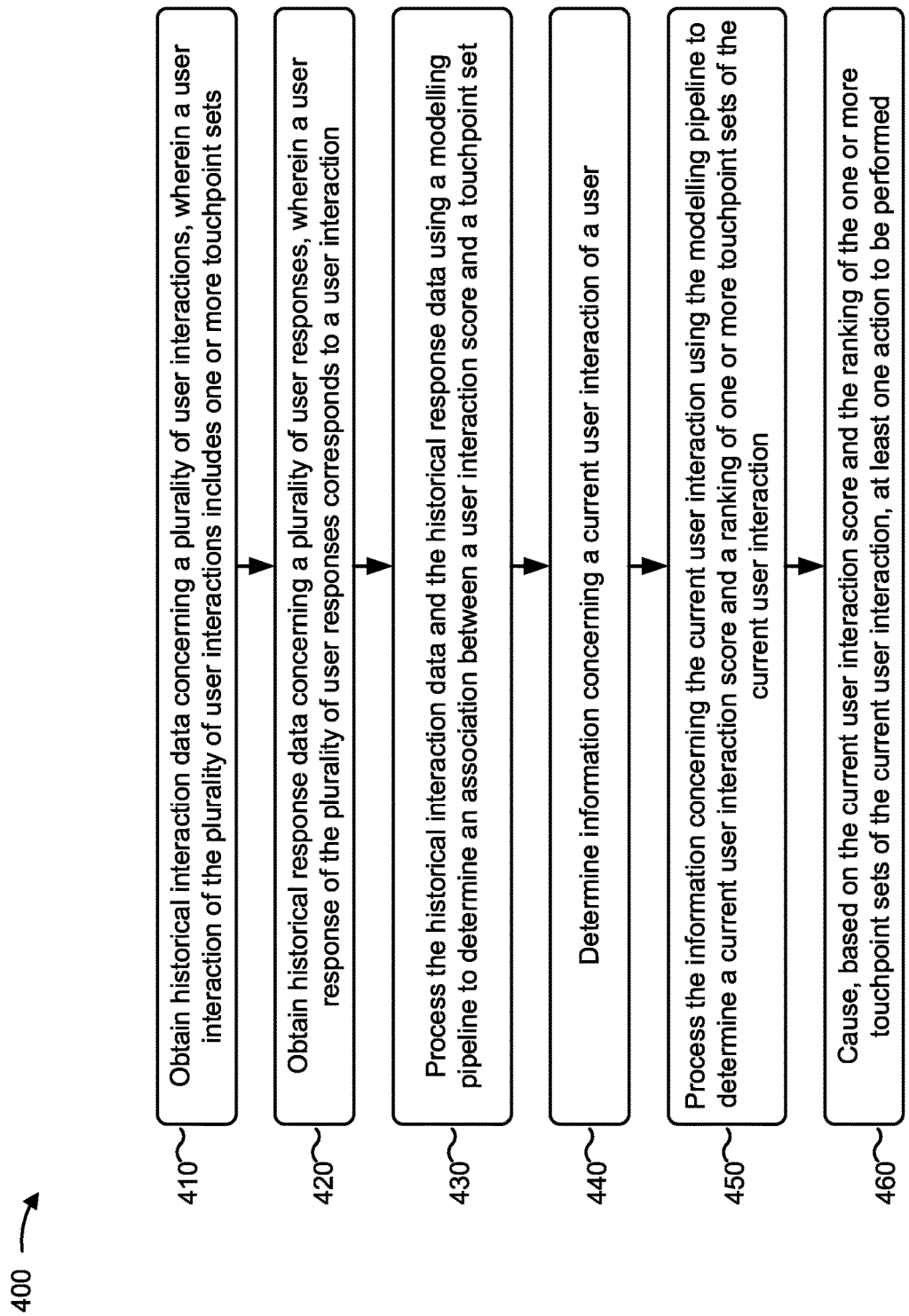
FIGS. 4-6 are flow charts of example processes for performing an action based on user interaction data.

FIG. 4 is a flow chart of an example process 400 for performing an action based on user interaction data. In some implementations, one or more process blocks of FIG. 4 may be performed by an interaction monitoring platform (e.g., interaction monitoring platform 220). In some implementations, one or more process blocks of FIG. 4 may be performed by another device or a group of devices separate from or including the interaction monitoring platform, such as a server device (e.g., server device 210), a client device (e.g., client device 230), and/or the like.

As shown in FIG. 4, process 400 may include obtaining historical interaction data concerning a plurality of user interactions, wherein a user interaction of the plurality of user interactions includes one or more touchpoint sets (block 410). For example, the interaction monitoring platform (e.g., using computing resource 224, processor 320, memory 330, storage component 340, input component 350, communication interface 370, and/or the like) may obtain historical interaction data concerning a plurality of user interactions, as described above. In some implementations, a user interaction of the plurality of user interactions may include one or more touchpoint sets.

As further shown in FIG. 4, process 400 may include obtaining historical response data concerning a plurality of user responses, wherein a user response of the plurality of user responses corresponds to a user interaction (block 420). For example, the interaction monitoring platform (e.g., using computing resource 224, processor 320, memory 330, storage component 340, input component 350, communication interface 370, and/or the like) may obtain historical response data concerning a plurality of user responses, as described above. In some implementations, a user response of the plurality of user responses may correspond to a user interaction.

As further shown in FIG. 4, process 400 may include processing the historical interaction data and the historical response data using a modelling pipeline to determine an association between a user interaction score and a touchpoint set (block 430). For example, the interaction monitoring platform (e.g., using computing resource 224, processor 320, memory 330, storage component 340, and/or the like) may process the historical interaction data and the historical response data using a modelling pipeline to determine an association between a user interaction score and a touchpoint set, as described above.

As further shown in FIG. 4, process 400 may include determining information concerning a current user interaction of a user (block 440). For example, the interaction monitoring platform (e.g., using computing resource 224, processor 320, memory 330, storage component 340, and/or the like) may determine information concerning a current user interaction of a user, as described above.

As further shown in FIG. 4, process 400 may include processing the information concerning the current user interaction using the modelling pipeline to determine a current user interaction score and a ranking of one or more touchpoint sets of the current user interaction (block 450). For example, the interaction monitoring platform (e.g., using computing resource 224, processor 320, memory 330, storage component 340, and/or the like) may process the information concerning the current user interaction using the modelling pipeline to determine a current user interaction score and a ranking of one or more touchpoint sets of the current user interaction, as described above.

As further shown in FIG. 4, process 400 may include causing, based on the current user interaction score and the ranking of the one or more touchpoint sets of the current user interaction, at least one action to be performed (block 460). For example, the interaction monitoring platform (e.g., using computing resource 224, processor 320, memory 330, storage component 340, input component 350, output component 360, communication interface 370, and/or the like) may cause, based on the current user interaction score and the ranking of the one or more touchpoint sets of the current user interaction, at least one action to be performed, as described above.

Process 400 may include additional implementations, such as any single implementation or any combination of implementations described below and/or in connection with one or more other processes described elsewhere herein.

In some implementations, when processing the historical interaction data and the historical response data using the modelling pipeline to determine the association between the user interaction score and the touchpoint set, the interaction monitoring platform may process the historical interaction data and the historical response data using at least one of the following techniques: a pattern mining technique, a gradient boosting technique, or a recursive feature elimination technique.

In some implementations, the historical interaction data may concern a plurality of users, where each user of the plurality of users is associated with a set of user interactions, of the plurality of user interactions. In some implementations, the current user interaction score may indicate a current sentiment of the user at a current stage of the current user interaction, a first current likelihood that the user will provide a response concerning the current stage of the current user interaction, and/or a second current likelihood that the user will respond to marketing concerning the current stage of the current user interaction.

In some implementations, the current user interaction may concern an interaction between the user and an organization, and, when causing the at least one action to be performed, the interaction monitoring platform may determine, based on the current user interaction score and the ranking of the one or more touchpoint sets of the current user interaction, that a representative of the organization is to communicate with the user, may determine a communication device of the representative and a communication device of the user, and may cause the communication device of the representative to initiate a communication session with the communication device of the user.

In some implementations, the current user interaction may concern a financial account of the user, and, when causing the at least one action to be performed, the interaction monitoring platform may determine, based on the current user interaction score and the ranking of the one or more touchpoint sets of the current user interaction, a monetary credit, and may cause the monetary credit to be added to the financial account of the user.

In some implementations, the current user interaction may concern a bill of the user, and, when causing the at least one action to be performed, the interaction monitoring platform may determine information concerning the bill, may calculate, based on the current user interaction score, the ranking of the one or more touchpoint sets of the current user interaction, and the information concerning the bill, a bill discount, may generate a message concerning the bill discount, and may send the message to an electronic messaging account associated with the user.

In some implementations, the current user interaction may concern an account of the user and a bill, and, when causing the at least one action to be performed, the interaction monitoring platform may determine, based on the current user interaction score, the ranking of the one or more touchpoint sets of the current user interaction, and the information concerning the current user interaction, that the account has insufficient assets to pay the bill, may cause assets of another account of the user to be transferred to the account, may schedule a date for the bill to be paid using assets of the account, and may enroll the account in an overdraft protection plan.

In some implementations, the current user interaction may concern a transaction card of the user and a transaction terminal, and, when causing the at least one action to be performed, the interaction monitoring platform may determine, based on the current user interaction score, the ranking of the one or more touchpoint sets of the current user interaction, and the information concerning the current user interaction, an issue concerning the transaction card, may cause the transaction terminal to decline the transaction card, may cause a different device to cancel the transaction card, and may cause the different device to issue a new transaction card to the user.

In some implementations, the interaction monitoring platform may generate, based on the current user interaction score and the ranking of the one or more touchpoint sets of the current user interaction, an alert, and may send the alert to a different device to cause the different device to display the alert.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
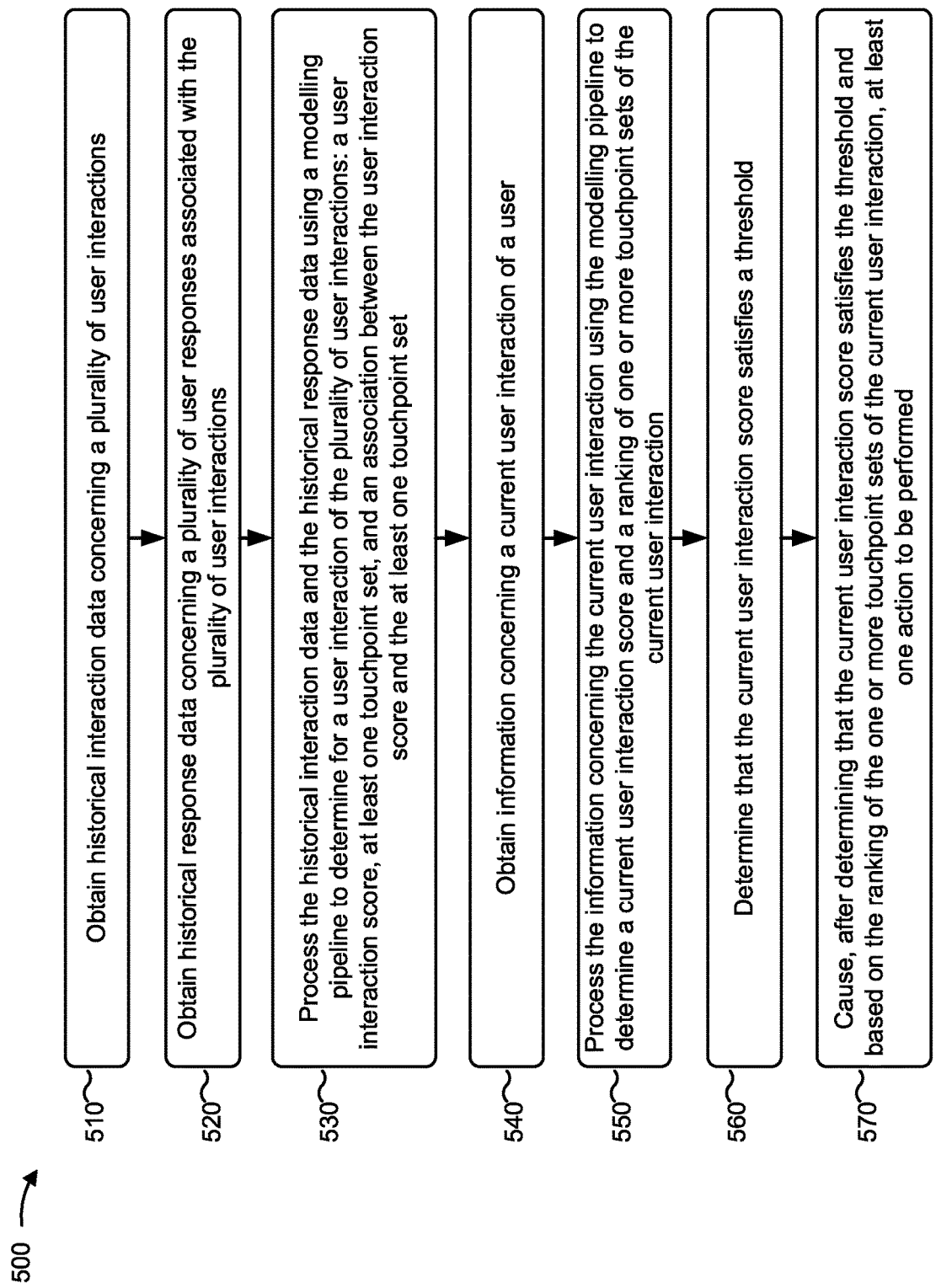

FIG. 5 is a flow chart of an example process 500 for performing an action based on user interaction data. In some implementations, one or more process blocks of FIG. 5 may be performed by an interaction monitoring platform (e.g., interaction monitoring platform 220). In some implementations, one or more process blocks of FIG. 5 may be performed by another device or a group of devices separate from or including the interaction monitoring platform, such as a server device (e.g., server device 210), a client device (e.g., client device 230), and/or the like.

As shown in FIG. 5, process 500 may include obtaining historical interaction data concerning a plurality of user interactions (block 510). For example, the interaction monitoring platform (e.g., using computing resource 224, processor 320, memory 330, storage component 340, input component 350, communication interface 370, and/or the like) may obtain historical interaction data concerning a plurality of user interactions, as described above.

As further shown in FIG. 5, process 500 may include obtaining historical response data concerning a plurality of user responses associated with the plurality of user interactions (block 520). For example, the interaction monitoring platform (e.g., using computing resource 224, processor 320, memory 330, storage component 340, input component 350, communication interface 370, and/or the like) may obtain historical response data concerning a plurality of user responses associated with the plurality of user interactions, as described above.

As further shown in FIG. 5, process 500 may include processing the historical interaction data and the historical response data using a modelling pipeline to determine for a user interaction of the plurality of user interactions: a user interaction score, at least one touchpoint set, and an association between the user interaction score and the at least one touchpoint set (block 530). For example, the interaction monitoring platform (e.g., using computing resource 224, processor 320, memory 330, storage component 340, and/or the like) may process the historical interaction data and the historical response data using a modelling pipeline to determine for a user interaction of the plurality of user interactions: a user interaction score, at least one touchpoint set, and an association between the user interaction score and the at least one touchpoint set, as described above.

As further shown in FIG. 5, process 500 may include obtaining information concerning a current user interaction of a user (block 540). For example, the interaction monitoring platform (e.g., using computing resource 224, processor 320, memory 330, storage component 340, input component 350, communication interface 370, and/or the like) may obtain information concerning a current user interaction of a user, as described above.

As further shown in FIG. 5, process 500 may include processing the information concerning the current user interaction using the modelling pipeline to determine a current user interaction score and a ranking of one or more touchpoint sets of the current user interaction (block 550). For example, the interaction monitoring platform (e.g., using computing resource 224, processor 320, memory 330, storage component 340, and/or the like) may process the information concerning the current user interaction using the modelling pipeline to determine a current user interaction score and a ranking of one or more touchpoint sets of the current user interaction.

As further shown in FIG. 5, process 500 may include determining that the current user interaction score satisfies a threshold (block 560). For example, the interaction monitoring platform (e.g., using computing resource 224, processor 320, memory 330, storage component 340, and/or the like) may determine that the current user interaction score satisfies a threshold, as described above.

As further shown in FIG. 5, process 500 may include causing, after determining that the current user interaction score satisfies the threshold and based on the ranking of the one or more touchpoint sets of the current user interaction, at least one action to be performed (block 570). For example, the interaction monitoring platform (e.g., using computing resource 224, processor 320, memory 330, storage component 340, input component 350, output component 360, communication interface 370, and/or the like) may cause, after determining that the current user interaction score satisfies the threshold and based on the ranking of the one or more touchpoint sets of the current user interaction, at least one action to be performed, as described above.

Process 500 may include additional implementations, such as any single implementation or any combination of implementations described below and/or in connection with one or more other processes described elsewhere herein.

In some implementations, the information concerning the current user interaction may concern at least one of the following interactions: a mobile application interaction, a payment interaction, a withdrawal interaction, a deposit interaction, a returned payment interaction, a transaction card terminal interaction, a bill payment interaction; a website interaction, a customer service interaction, a virtual assistant interaction, a point of sale interaction, a financial product interaction, a financial product application interaction, or a financial account interaction.

In some implementations, when causing the at least one action to be performed, the interaction monitoring platform may generate a survey based on the information concerning the current user interaction, may send the survey to a user device associated with the user, may receive, based on sending the survey, a survey response, and may retrain a model based on the survey and the survey response.

In some implementations, the information concerning the current user interaction may concern an organization, and, when causing the at least one action to be performed, the interaction monitoring platform may determine an availability of the user, and schedule, based on the availability of the user, a time for a representative of the organization to call the user.

In some implementations, when causing the at least one action to be performed, the interaction monitoring platform may generate an alert that includes the information that indicates the current user interaction score, information that indicates that action needs to be taken, information that indicates the at least one action, and may send the alert to a different device to cause the different device to display the alert on a display of the different device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
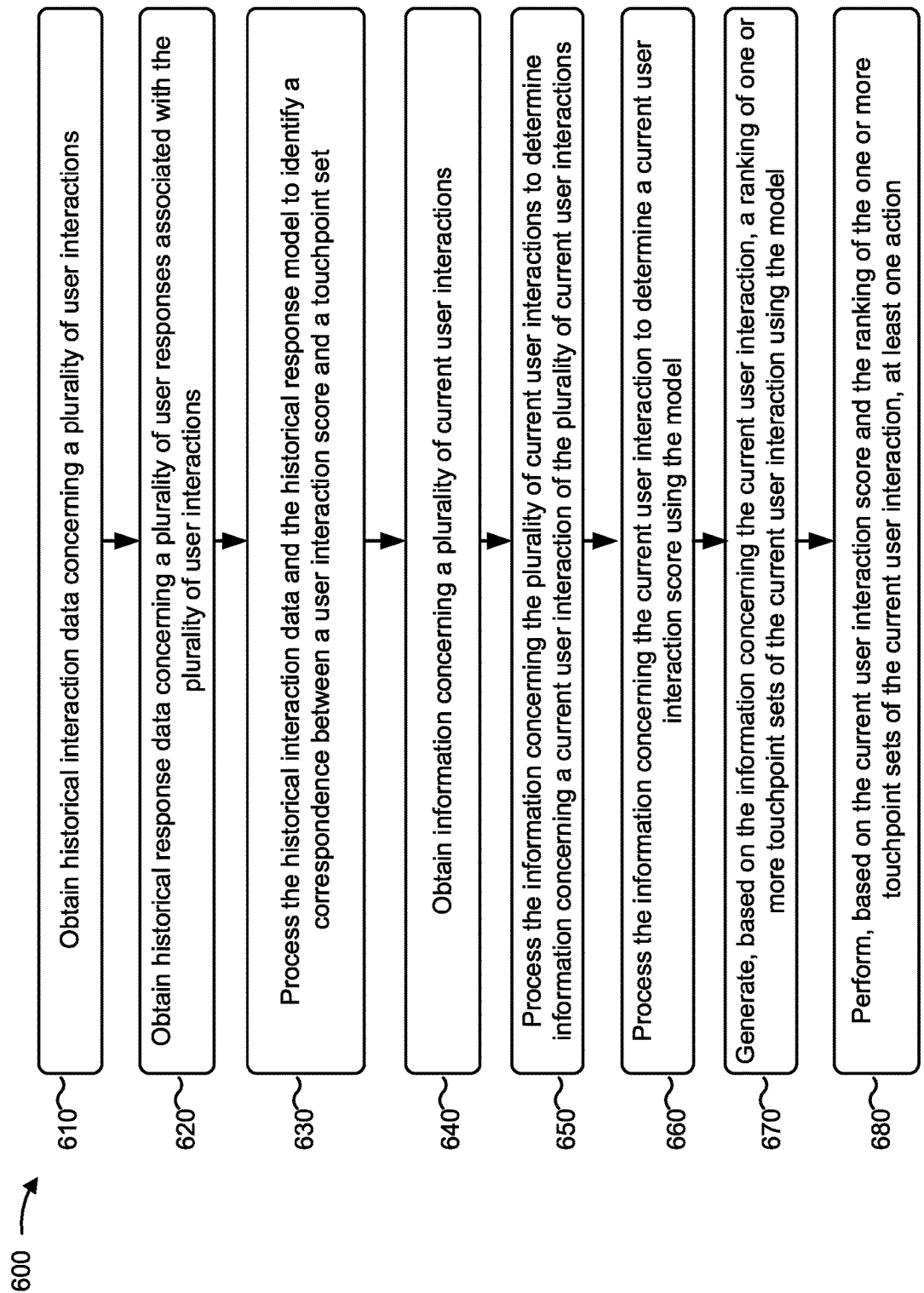

FIG. 6 is a flow chart of an example process 600 for performing an action based on user interaction data. In some implementations, one or more process blocks of FIG. 6 may be performed by an interaction monitoring platform (e.g., interaction monitoring platform 220). In some implementations, one or more process blocks of FIG. 6 may be performed by another device or a group of devices separate from or including the interaction monitoring platform, such as a server device (e.g., server device 210), a client device (e.g., client device 230), and/or the like.

As shown in FIG. 6, process 600 may include obtaining historical interaction data concerning a plurality of user interactions (block 610). For example, the interaction monitoring platform (e.g., using computing resource 224, processor 320, memory 330, storage component 340, input component 350, communication interface 370, and/or the like) may obtain historical interaction data concerning a plurality of user interactions, as described above.

As further shown in FIG. 6, process 600 may include obtaining historical response data concerning a plurality of user responses associated with the plurality of user interactions (block 620). For example, the interaction monitoring platform (e.g., using computing resource 224, processor 320, memory 330, storage component 340, input component 350, communication interface 370, and/or the like) may obtain historical response data concerning a plurality of user responses associated with the plurality of user interactions, as described above.

As further shown in FIG. 6, process 600 may include processing the historical interaction data and the historical response data to train a model to identify a correspondence between a user interaction score and a touchpoint set (block 630). For example, the interaction monitoring platform (e.g., using computing resource 224, processor 320, memory 330, storage component 340, and/or the like) may process the historical interaction data and the historical response data to train a model to identify a correspondence between a user interaction score and a touchpoint set, as described above.

As further shown in FIG. 6, process 600 may include obtaining information concerning a plurality of current user interactions (block 640). For example, the interaction monitoring platform (e.g., using computing resource 224, processor 320, memory 330, storage component 340, input component 350, communication interface 370, and/or the like) may obtain information concerning a plurality of current user interactions, as described above.

As further shown in FIG. 6, process 600 may include processing the information concerning the plurality of current user interactions to determine information concerning a current user interaction of the plurality of current user interactions (block 650). For example, the interaction monitoring platform (e.g., using computing resource 224, processor 320, memory 330, storage component 340, and/or the like) may process the information concerning the plurality of current user interactions to determine information concerning a current user interaction of the plurality of current user interactions, as described above.

As further shown in FIG. 6, process 600 may include processing the information concerning the current user interaction to determine a current user interaction score using the model (block 660). For example, the interaction monitoring platform (e.g., using computing resource 224, processor 320, memory 330, storage component 340, and/or the like) may process the information concerning the current user interaction to determine a current user interaction score using the model, as described above.

As further shown in FIG. 6, process 600 may include generating, based on the information concerning the current user interaction, a ranking of one or more touchpoint sets of the current user interaction using the model (block 670). For example, the interaction monitoring platform (e.g., using computing resource 224, processor 320, memory 330, storage component 340, and/or the like) may generate, based on the information concerning the current user interaction, a ranking of one or more touchpoint sets of the current user interaction using the model, as described above.

As further shown in FIG. 6, process 600 may include performing, based on the current user interaction score and the ranking of the one or more touchpoint sets of the current user interaction, at least one action (block 680). For example, the interaction monitoring platform (e.g., using computing resource 224, processor 320, memory 330, storage component 340, input component 350, output component 360, communication interface 370, and/or the like) may perform, based on the current user interaction score and the ranking of the one or more touchpoint sets of the current user interaction, at least one action, as described above.

Process 600 may include additional implementations, such as any single implementation or any combination of implementations described below and/or in connection with one or more other processes described elsewhere herein.

In some implementations, when processing the historical interaction data and the historical response data to train the model to identify the correspondence between the user interaction score and the touchpoint set, the interaction monitoring platform may process the historical interaction data and the historical response data using a recursive feature elimination technique and a gradient boosting technique to determine the correspondence between the user interaction score and the touchpoint set.

In some implementations, when performing the at least one action, the interaction monitoring platform may determine a user device associated with the current user interaction, and may initiate a communication session with the user device to enable a virtual assistant to communicate with a user of the user device. In some implementations, the current user interaction may concern a user interacting with an interactive voice response (IVR) system, and, when performing the at least one action, the interaction monitoring platform may change a menu routing path of the IVR system.

In some implementations, the current user interaction may concern a user interacting with an interactive voice response (IVR) system via a communication session, and, when performing the at least one action, the interaction monitoring platform may prevent the IVR system from communicating with the user via the communication session, and may connect the communication session to a communication device of an agent.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, configured to:
obtain historical interaction data concerning a plurality of user interactions,
wherein a user interaction of the plurality of user interactions includes one or more touchpoint sets;
obtain historical response data concerning a plurality of user responses,
wherein a user response of the plurality of user responses corresponds to the user interaction;
process the historical interaction data and the historical response data using a modelling pipeline to determine an association between a user interaction score and a touchpoint set,
the touchpoint set including one or more of:
first touchpoint data indicating who initiated the user interaction,
second touchpoint data indicating how the user interaction was initiated,
third touchpoint data indicating why the user interaction was initiated,
fourth touchpoint data indicating information communicated during the user interaction,
fifth touchpoint data indicating how long the user interaction lasted,
sixth touchpoint data indicating a wait time associated with the user interaction,
seventh touchpoint data indicating whether the user interaction is associated with an existing user interaction issue,
eighth touchpoint data indicating whether the user interaction was associated with user dissatisfaction, or
ninth touchpoint data indicating a corrective action taken regarding the user interaction;
train, based on processing the historical interaction data, a first machine learning model,
the first machine learning model being trained to determine associations between user interaction scores and touchpoint sets;
determine information concerning a current user interaction of a user;
process the information concerning the current user interaction using the first machine learning model to determine a current user interaction score and a ranking of a plurality of current touchpoint sets for the current user interaction, each current touchpoint set of the plurality of current touchpoint sets being associated with a respective user interaction score, there being a degree of association between each of the current touchpoint sets and the respective user interaction score that varies for different ones of the current touchpoint sets, and wherein the ranking of the plurality of current touchpoint sets is based on the degrees of association,
the current user interaction score being based on one or more current touchpoint sets of the plurality of current touchpoint sets;
identify, after determining the current user interaction score and the ranking of the plurality of current touchpoint sets, and based on identifying a highest ranking touchpoint set of the plurality of current touchpoint sets, an additional touchpoint set,
the additional touchpoint set being different from the highest ranking touchpoint set, and
the additional touchpoint set being associated with an additional user interaction score that exceeds the current user interaction score;
determine, based on the additional touchpoint set, at least one action to be performed; and
cause, based on the additional touchpoint set being associated with the additional user interaction score that exceeds the current user interaction score, the at least one action to be performed, wherein the one or more processors, when causing the at least one action to be performed, are configured to:
generate an alert that includes information that indicates the current user interaction score, information that indicates that action needs to be taken, and information that indicates the at least one action; and
send the alert to a different device to cause the different device to display the alert on a display of the different device.

2. The device of claim 1, wherein the one or more processors, when processing the historical interaction data and the historical response data using the modelling pipeline to determine the association between the user interaction score and the touchpoint set, are configured to:
process the historical interaction data and the historical response data using at least one of:
a pattern mining technique;
a gradient boosting technique; or
a recursive feature elimination technique.

3. The device of claim 1, wherein the historical interaction data concerns a plurality of users,
wherein each user of the plurality of users is associated with a set of user interactions of the plurality of user interactions.

4. The device of claim 1, wherein the current user interaction score indicates at least one of:
a current sentiment of the user at a current stage of the current user interaction;
a first current likelihood that the user will provide a response concerning the current stage of the current user interaction; or
a second current likelihood that the user will respond to marketing concerning the current stage of the current user interaction.

5. The device of claim 1, wherein the current user interaction concerns an interaction between the user and an organization,
wherein the one or more processors, when causing the at least one action to be performed, are further configured to:
determine, based on the current user interaction score and the ranking of the plurality of current touchpoint sets, that a representative of the organization is to communicate with the user;

determine a communication device of the representative and a communication device of the user; and
cause the communication device of the representative to initiate a communication session with the communication device of the user.

6. The device of claim 1, wherein the current user interaction concerns a financial account of the user,
wherein the one or more processors, when causing the at least one action to be performed, are further configured to:
determine, based on the current user interaction score and the ranking of the plurality of current touchpoint sets, a monetary credit; and
cause the monetary credit to be added to the financial account of the user.

7. The device of claim 1, wherein the current user interaction concerns a bill of the user,
wherein the one or more processors, when causing the at least one action to be performed, are further configured to:
determine information concerning the bill;
calculate, based on the current user interaction score, the ranking of the plurality of current touchpoint sets, and the information concerning the bill, a bill discount;
generate a message concerning the bill discount; and
send the message to an electronic messaging account associated with the user.

8. The device of claim 1, wherein the current user interaction concerns an account of the user and a bill,
wherein the one or more processors, when causing the at least one action to be performed, are further configured to:
determine, based on the current user interaction score, the ranking of the plurality of current touchpoint sets, and the information concerning the current user interaction, that the account has insufficient assets to pay the bill;
cause assets of another account of the user to be transferred to the account;
schedule a date for the bill to be paid using assets of the account; and
enroll the account in an overdraft protection plan.

9. The device of claim 1, wherein the current user interaction concerns a transaction card of the user and a transaction terminal,
wherein the one or more processors, when causing the at least one action to be performed, are further configured to:
determine, based on the current user interaction score, the ranking of the plurality of current touchpoint sets, and the information concerning the current user interaction, an issue concerning the transaction card;
cause the transaction terminal to decline the transaction card;
cause another device to cancel the transaction card; and
cause the other device to issue a new transaction card to the user.

10. The device of claim 1, wherein the one or more processors, when generating the alert, are configured to:
generate the alert based on the current user interaction score and the ranking of the plurality of current touchpoint sets.

11. A non-transitory computer-readable medium storing instructions, the instructions comprising:
one or more instructions that, when executed by one or more processors of a device, cause the one or more processors to:
obtain historical interaction data concerning a plurality of user interactions;
obtain historical response data concerning a plurality of user responses associated with the plurality of user interactions;
process the historical interaction data and the historical response data using a modelling pipeline to determine, for a user interaction of the plurality of user interactions:
a user interaction score,
at least one touchpoint set, and
an association between the user interaction score and the at least one touchpoint set,
each touchpoint set of the at least one touchpoint set including one or more of:
first touchpoint data indicating who initiated the user interaction,
second touchpoint data indicating how the user interaction was initiated,
third touchpoint data indicating why the user interaction was initiated,
fourth touchpoint data indicating information communicated during the user interaction,
fifth touchpoint data indicating how long the user interaction lasted,
sixth touchpoint data indicating a wait time associated with the user interaction,
seventh touchpoint data indicating whether the user interaction is associated with an existing user interaction issue,
eighth touchpoint data indicating whether the user interaction was associated with user dissatisfaction, or
ninth touchpoint data indicating a corrective action taken regarding the user interaction;
train, based on processing the historical interaction data, a first machine learning model,
the first machine learning model being trained to determine associations between user interaction scores and touchpoint sets;
obtain information concerning a current user interaction of a user;
process the information concerning the current user interaction using the first machine learning model to determine a current user interaction score and a ranking of a plurality of current touchpoint sets for the current user interaction, each current touchpoint set of the plurality of current touchpoint sets being associated with a respective user interaction score, there being a degree of association between each of the current touchpoint sets and the respective user interaction score that varies for different ones of the current touchpoint sets, and wherein the ranking of the plurality of current touchpoint sets is based on the degrees of association,
the current user interaction score being based on one or more current touchpoint sets of the plurality of current touchpoint sets;
determine that the current user interaction score satisfies a threshold;
identify, after determining the current user interaction score and the ranking of the plurality of current touchpoint sets, and based on identifying a highest ranking touchpoint set of the plurality of current touchpoint sets, an additional touchpoint set,
the additional touchpoint set being different from the highest ranking touchpoint set, and
the additional touchpoint set being associated with an additional user interaction score that exceeds the current user interaction score;
determine, based on the additional touchpoint set, at least one action to be performed; and
cause, based on the additional touchpoint set being associated with the additional user interaction score that exceeds the current user interaction score, the at least one action to be performed, wherein the one or more instructions, that cause the one or more processors to cause the at least one action to be performed, cause the one or more processors to:
generate an alert that includes information that indicates the current user interaction score, information that indicates that action needs to be taken, and information that indicates the at least one action; and
send the alert to a different device to cause the different device to display the alert on a display of the different device.

12. The non-transitory computer-readable medium of claim 11, wherein the information concerning the current user interaction concerns at least one of the following interactions:
a mobile application interaction;
a payment interaction;
a withdrawal interaction;
a deposit interaction;
a returned payment interaction;
a transaction card terminal interaction;
a bill payment interaction;
a website interaction;
a customer service interaction;
a virtual assistant interaction;
a point of sale interaction;
a financial product interaction;
a financial product application interaction; or
a financial account interaction.

13. The non-transitory computer-readable medium of claim 11, wherein the one or more instructions, that cause the one or more processors to cause the at least one action to be performed, further cause the one or more processors to:
generate a survey based on the information concerning the current user interaction;
send the survey to a user device associated with the user;
receive, based on sending the survey, a survey response; and
retrain a model based on the survey and the survey response.

14. The non-transitory computer-readable medium of claim 11, wherein the information concerning the current user interaction concerns an organization,
wherein the one or more instructions, that cause the one or more processors to cause the at least one action to be performed, further cause the one or more processors to:
determine an availability of the user; and
schedule, based on the availability of the user, a time for a representative of the organization to call the user.

15. The non-transitory computer-readable medium of claim 11, wherein the one or more instructions, that cause the one or more processors to cause the at least one action to be performed, further cause the one or more processors to:
change a menu path of an interactive voice response (IVR) system associated with the current user interaction.

16. A method, comprising:
obtaining, by a device, historical interaction data concerning a plurality of user interactions;
obtaining, by the device, historical response data concerning a plurality of user responses associated with the plurality of user interactions;
processing, by the device, the historical interaction data and the historical response data to train a first machine learning model to determine associations between user interaction scores and touchpoint sets,
the touchpoint sets including one or more of:
first touchpoint data indicating who initiated a user interaction,
second touchpoint data indicating how the user interaction was initiated,
third touchpoint data indicating why the user interaction was initiated,
fourth touchpoint data indicating information communicated during the user interaction,
fifth touchpoint data indicating how long the user interaction lasted,
sixth touchpoint data indicating a wait time associated with the user interaction,
seventh touchpoint data indicating whether the user interaction is associated with an existing user interaction issue,
eighth touchpoint data indicating whether the user interaction was associated with user dissatisfaction, or
ninth touchpoint data indicating a corrective action taken regarding the user interaction;
obtaining, by the device, information concerning a plurality of current user interactions;
processing, by the device, the information concerning the plurality of current user interactions to determine information concerning a current user interaction of the plurality of current user interactions;
processing, by the device and using the first machine learning model, the information concerning the current user interaction to determine a current user interaction score and a ranking of a plurality of current touchpoint sets for the current user interaction, each current touchpoint set of the plurality of current touchpoint sets being associated with a respective user interaction score, there being a degree of association between each of the current touchpoint sets and the respective user interaction score that varies for different ones of the current touchpoint sets, and wherein the ranking of the plurality of current touchpoint sets is based on the degrees of association,
the current user interaction score being based on the plurality of current touchpoint sets;
identifying, by the device, after determining the current user interaction score and the ranking of the plurality of current touchpoint sets, and based on identifying a highest ranking touchpoint set of the plurality of current touchpoint sets, an additional touchpoint set,
the additional touchpoint set being different from the highest ranking touchpoint set, and
the additional touchpoint set being associated with an additional user interaction score that exceeds the current user interaction score;
determining, by the device and based on the additional touchpoint set, at least one action to be performed; and performing, by the device and based on the additional touchpoint set being associated with the additional user interaction score that exceeds the current user interaction score, the at least one action,
    wherein the current user interaction concerns a user interacting with an interactive voice response (IVR) system, and
    wherein the performing the at least one action comprises changing a menu routing path of the IVR system.

17. The method of claim 16, wherein the processing the historical interaction data and the historical response data to train the first machine learning model comprises:
    processing the historical interaction data and the historical response data using a recursive feature elimination technique and a gradient boosting technique to determine the associations between the user interaction scores and the touchpoints sets.

18. The method of claim 16, wherein the performing the at least one action further comprises:
    determining a user device associated with the current user interaction; and
    initiating a communication session with the user device to enable a virtual assistant to communicate with the user via the user device.

19. The method of claim 16, wherein the current user interaction concerns the user interacting with the interactive voice response (IVR) system via a communication session, wherein the performing the at least one action further comprises:
    preventing the IVR system from communicating with the user via the communication session; and
    connecting the communication session to a communication device of an agent.

20. The method of claim 16, wherein the performing the at least one action further comprises:
    generating an alert that includes information that indicates the current user interaction score, information that indicates that action needs to be taken, and information that indicates the at least one action; and
    sending the alert to a different device to cause the different device to display the alert on a display of the different device.

\* \* \* \* \*